United States Patent

[11] 3,580,196

| [72] | Inventor | Earston Arthur Lofgreen |
| | | Coolidge, Ariz. |
| [21] | Appl. No. | 732,226 |
| [22] | Filed | May 27, 1968 |
| [45] | Patented | May 25, 1971 |
| [73] | Assignee | Occidental Petroleum Corporation |

[54] PLASTIC MULCH
2 Claims, 13 Drawing Figs.

| [52] | U.S. Cl. | 111/1, 47/9 |
| [51] | Int. Cl. | A01g 1/00 |
| [50] | Field of Search | 47/9, 32; 111/1 |

[56] References Cited
UNITED STATES PATENTS

| 3,180,290 | 4/1965 | Kappelmann et al. | 47/9X |
| 1,110,377 | 9/1914 | Cowles | 47/32 |
| 1,396,269 | 11/1921 | Eckart | 47/9 |
| 1,910,289 | 5/1933 | Hoag | 47/9 |
| 3,302,323 | 2/1967 | Popa | 47/9 |
| 3,330,070 | 7/1967 | Ferm et al. | 47/9 |

FOREIGN PATENTS

| 556,842 | 10/1943 | Great Britain | 47/9 |

*Primary Examiner*—Robert E. Bagwill
*Attorneys*—William N. Patrick and Robert A. Kelly ABSTRACT: An agronomic mulch sheet and method comprising a flexible mulch sheet having first openings spaced a distance equaling the desired spacing of plants and release portions in said sheet whereby the first openings may be enlarged when they are pulled upwardly over partially grown plants in order to remove the sheet from a plant row; the method comprising preliminary planting of seeds in closely spaced relation, and the growth of plants through areas only covered by said openings in said sheet.

PATENTED MAY 25 1971 3,580,196

INVENTOR.
ARTHUR E. LOFGREEN
BY
Wm. H. Dean

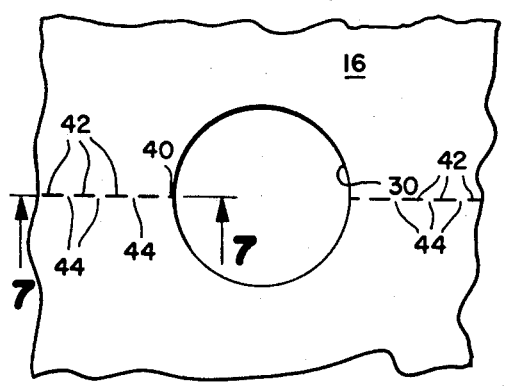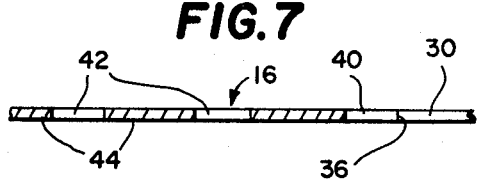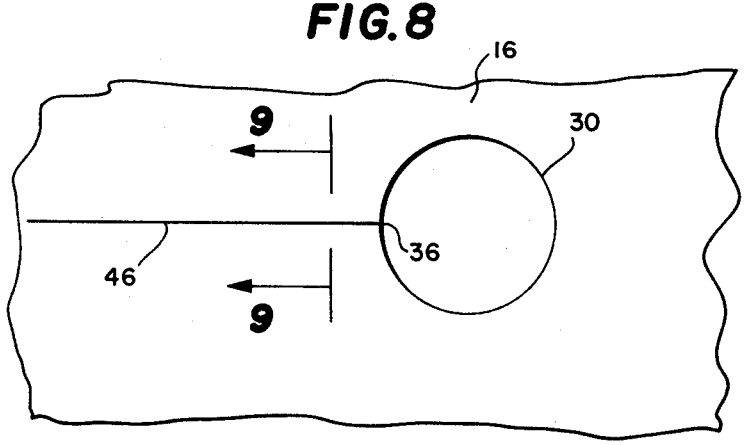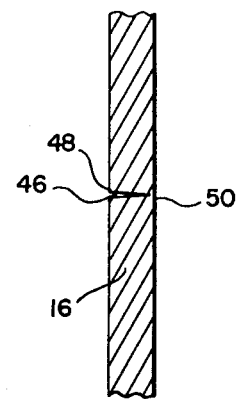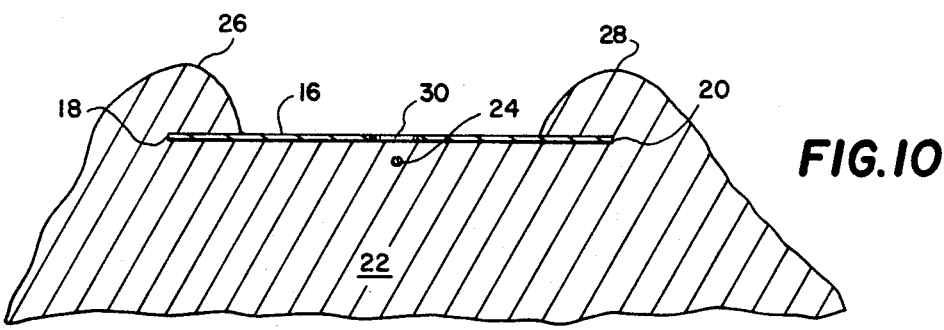

INVENTOR.
ARTHUR E. LOFGREEN
BY

PLASTIC MULCH

BACKGROUND OF THE INVENTION

Flexible plastic mulch sheets have been used experimentally with limited success in the agronomic production of various commodities. In some prior art experiments, mulch sheets have been pierced and seed planting devices have been thrust through the pierced plastic in order to implant seeds in the soil below the pierced portions. In some instances, the pierced openings have been insufficient as to area, and have caused plants which grow therethrough to be killed due to overheating of the plant shortly after germination. In almost all instances, however, difficulty has been encountered in removing the plastic mulch sheet from an area surrounding the trunks of plants and preliminary to harvesting time or at any other desirable time after the plants have attained a substantial size.

Plastic mulch sheets cannot be left in the field during the harvesting of cotton or other produce due to the fact that the plastic material may be collected with some of the harvested produce, and either be included in products or cause difficulty in the operation of harvesting machines, or other equipment such as cotton gins, or like. It is therefore important to avoid such difficulties of the prior art plastic mulches since this plastic material cannot be tolerated as an inclusion in food stuffs, nor can it be tolerated with relation to the malfunction of harvesting machinery or processing machinery. Additionally, prior art plastic mulching practices, including the structures of the mulch sheets and the methods for employing them have caused difficulty in the predetermined spacing of plants with relation to the openings in the sheets, and the prevention of growth of plants other than desired areas or properly spaced locations with relation to the plastic mulching sheets.

Subsequently, and following the growth of plants, much damage has been caused to small plants during attempts to remove the plastic mulch at a certain time preliminary to the harvesting of produce from the plants.

SUMMARY OF THE INVENTION

According to the present invention, an elongated plastic mulch sheet is provided with a row of openings, the openings being spaced apart distances equal to the desired spacing of plants, and the method of the invention comprises the planting of seeds in closely spaced relationship in a plant row of soil subsequent to which the plastic mulch sheet of the invention is laid over the row, the seeds being planted close enough to insure that at least one seed will cause a plant to grow through each of the spaced openings in the mulch sheet, and the mulch sheet will prevent the growth of plants in areas other than the openings in the mulch sheet. The mulch sheet of the invention is also provided with releasing portions adjacent the spaced opening; herein; said releasing portions adapted to perit an enlargement of the openings through which the plants grow when the mulching is pulled upwardly over the plants to clear the mulch sheet from the area of the plants preliminary to harvesting of produce therefrom.

Accordingly, it is an object of the present invention to provide a novel mulch sheet for agronomic production.

Another object of the invention is to provide a novel mulch sheet and method for agronomic production.

Another object of the invention is to provide a mulch sheet for agronomic production, wherein spaced openings in the sheet are adapted for use in growing plants therethrough; the sheets being provided further with releasing portions adjacent to the openings; said releasing portions adapted to enlarge the openings to permit the openings to be pulled upward over the plants for removing the mulch sheet after the plants have attained a substantial size.

Another object of the invention is to provide a novel method wherein the planting of seeds preliminarily includes closely spaced seeds in a row of soil, such as to insure the growth of one plant through each opening in the mulch sheet of the invention, and to prevent plants from growing in areas other than those of the said openings.

Another object of the invention is to provide a mulch sheet and method for agronomic production comprising the preparation of a mulch sheet of flexible material, the forming of a row of openings therethrough; said openings being spaced distances equaling those of desired plant spacing, and providing release portions adjacent to the openings, then seeding a plant row, such that seeds are closely spaced to insure a plant growing through each of the said openings, then placing the sheet over the planted seeds, then permitting the plants to grow to a substantial size, and then pulling the sheet upwardly over the plants, such that the releasing portions will cause said openings to increase to larger opening to permit a facility of removing the sheet directly over the plants without damaging them.

Another object of the invention is to provide a mulch sheet and method for agronomic production which provides for efficient temperature and moisture control; plant spacing, weed control, and the killing of various harmful plant fungus and insects, such as the pink bollworm moth pupae and other insects.

Further objects and advantages of the invention may be apparent from the following specifications, appended claims, and accompanying drawings:

BRIEF DESCRIPTION OF THE DRAWINGS

FIG. 6 is another view similar to FIG. 4, but showing a further modification of the invention;

FIG. 7 is an enlarged fragmentary sectional view taken from the line 7–7 of FIG. 6;

FIG. 8 is another view similar to FIGS. 4 and 6, but showing an additional modification of the invention;

FIG. 9 is an enlarged fragmentary sectional view taken from the line 9–9 of FIG. 8;

FIG. 10 is a transverse sectional view of the mulch sheet of the invention showing a plant row of soil and illustrating the disposition of a seed row therein as it is related to the mulch sheet of the invention;

DESCRIPTION OF THE PREFERRED EMBODIMENTS

Figure 1:
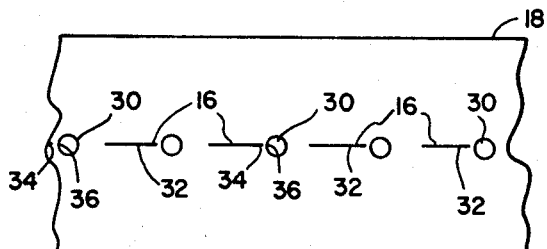
FIG. 1 is a fragmentary plan view of a short portion of an elongated mulch sheet in accordance with the present invention.

As shown in FIG. 1 of the drawings, a mulch sheet of the invention is designated 16. This mulch sheet is preferably made of thin flexible plastic which can, for example, be made of polyethylene and can range in thickness from 0.0005 to 0.003 inches in thickness. This is preferably black plastic for the purpose of absorbing radiant energy from the sun.

The mulch sheet of the invention is provided with opposite edges 18 and 20 spaced apart a distance, such as shown in FIG. 10 of the drawings, to span a plant row of soil 22 wherein a row of seeds 24 are disposed; the opposite edges 18 and 20 of the sheet being covered by ridges 26 and 28 of the soil to hold the mulch sheet in position. Accordingly, it will be appreciated that the width of the sheet from the edge 18 to the edge 20 may vary, as desired, in accordance with the particular row crop being covered.

Figure 3:
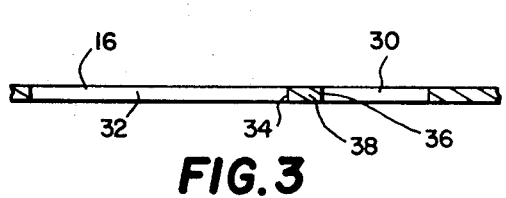
FIG. 3 is an enlarged fragmentary sectional view taken from the line 3–3 of FIG. 2.
Figure 2:
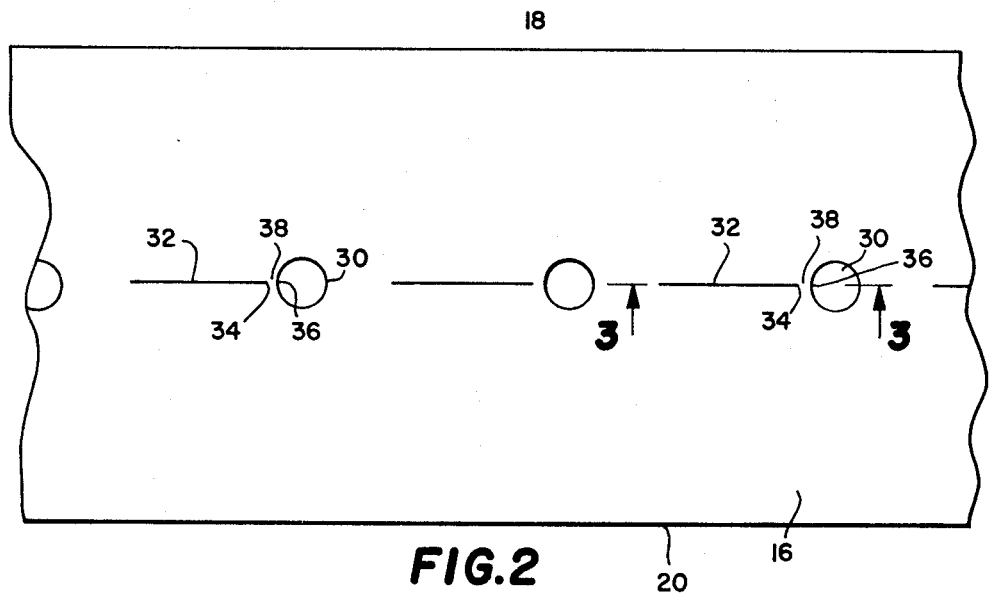
FIG. 2 is an enlarged fragmentary view similar to FIG. 1.

As shown in FIGS. 1, 2 and 3 of the drawings, the plastic mulch sheet of the invention is provided with a row of first openings 30 through which plants may grow, when the mulch sheet is in the position, as shown in FIG. 10 of the drawings.

These openings 30 are spaced apart a distance equal to the desired spacing of plants to be grown from the seeds 24 in the row 22.

The mulch sheet 16 is provided with a plurality of releasing portions 32 located between the openings 20; each releasing portion being closely adjacent the respective opening 30, as shown in detail in FIGS. 2 and 3 of the drawings. Alternatively, such releasing portions can be located closely adjacent opposite sides of each opening 30 (not shown).

As shown in section in FIG. 3 of the drawings, each releasing portion 32 constitutes a slit which extends completely through the sheet 16, and terminates at 34 close to the adjacent extremity 36 of one of the openings 30. Thus, the sheet 16 is perforated and is provided with an imperforate portion 38 between the end 34 of the slitted portion 32 and the extremity 36 of the adjacent opening 30. A similar small imperforate portion can be located on the side of the opening 30 opposite from extremity 36 in the event that releasing portions are located closely adjacent opposite sides of each such opening. This imperforate portion 38 is a very noniman structure considering the aforementioned thickness of the plastic and has very limited shear strength. Additionally, it will be understood that after the mulch sheet has been on the soil and exposed to the sun and the elements, that this portion 38 has very limited shear strength and will tear so as to enlarge the openings 30 into secondary openings, including the slits 32, which are sufficiently large to permit the openings 30 and the slits 32 to be formed into enlarged openings which will readily be pulled over plants in a plant row, as will be hereinafter described in connection with the disclosures of FIGS. 12 and 13.

It will be appreciated by those skilled in the art that the imperforate portions 38 form part of the releasing structure of the invention, and that the slits 32 and portions 38 thus form one version or species of the releasing portions of the invention which provide for the enlargement of the first openings 30 into larger openings including the slitted portions 32, as will be hereinafter described in detail.

Figure 4:
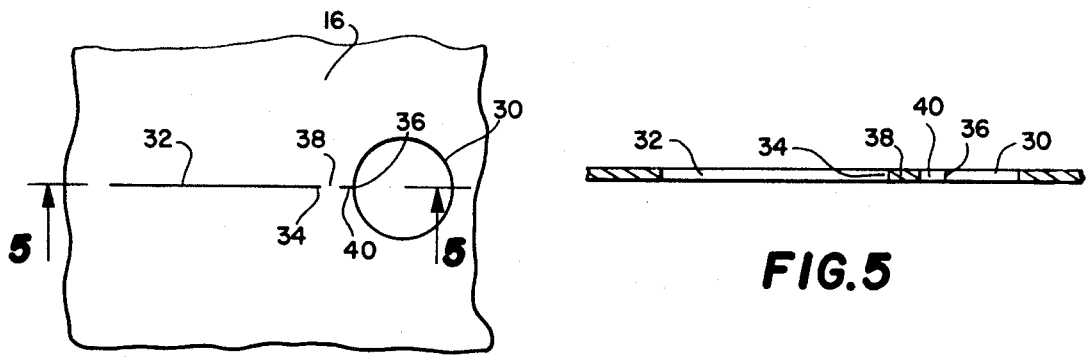
FIG. 4 is a view similar to FIG. 2, but showing structure on slightly enlarged scale and illustrating a modification of the invention.
Figure 5:
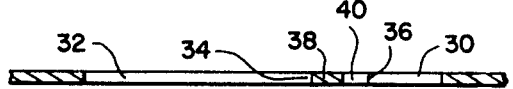
FIG. 5 is an enlarged fragmentary sectional view taken from the line 5–5 of FIG. 4.

A modification of the mulch sheet of the invention is shown in FIGS. 4 and 5 of the invention, wherein the mulch sheet 16 is provided with the openings 30 and slits 32. However, in this modification, a short slit 40 extends from the extremity 36 of the respective openings 30 so as to provide an incipient releasing portion, this structure being shown in FIG. 5. The short slit 40 extending to the imperforate portion 38 which is thus located between the slits 40 and the end 34 of the slitted portion 32. Accordingly, it will be appreciated that the short slit 40 provides for an incipient carrying portion communicating with the periphery of each round opening 30. A similar short slit can be located on the side of opening 30 opposite to the extremity 36, with an imperforate portion between such short slit and the nearest slit 32.

In the modification, as shown in FIGS. 6 and 7, the mulch sheet 16 is provided with openings 30, as hereinbefore described, and between the openings are spaced short slits in the form of perforations 42. The imperforate portions between these slits being designated 44 and capable of being torn to enlarge the openings 30 into a substantially larger opening when pulling the mulch sheet of the invention upwardly over partially grown plants, as illustrated best in FIG. 12 of the drawings. As shown in FIGS. 6 an 7, it will be seen that the short slits 40 described in connection with the disclosure of FIGS. 4 and 5 is also disclosed in FIGS. 6 and 7.

Figure 12:
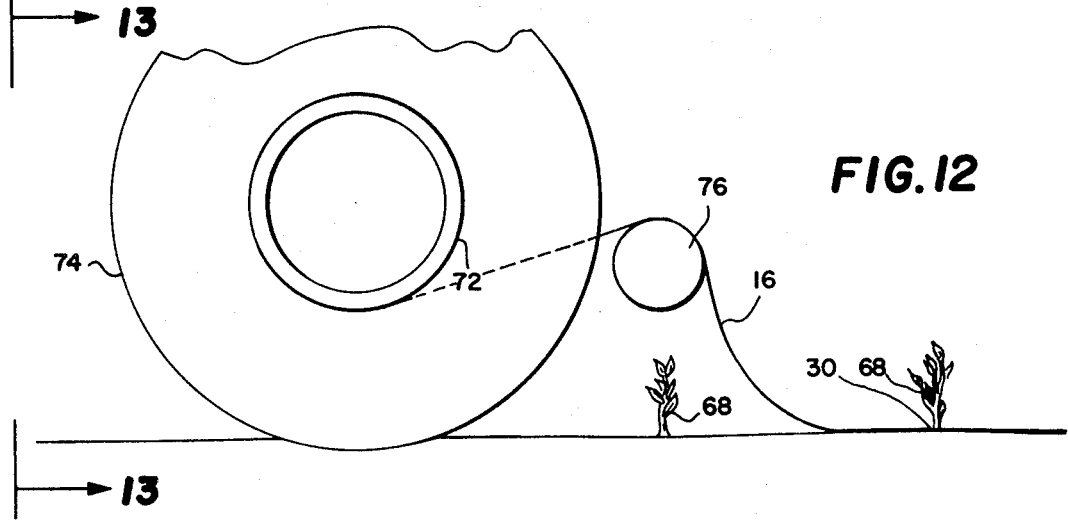
FIG. 12 is a diagrammatic view showing the removal of the plastic mulch sheet of the invention from a position over plants which are grown to a substantial size; and p

In the modification as shown in FIGS. 8 and 9, the mulch sheet 16 is provided with a plurality of openings 30, as hereinbefore described, and weakened releasing portions 46 are disposed in communication with each of the openings 30, either on one or opposite sides thereof. Such weakened releasing portions are preferably disposed longitudinally of the elongated plastic mulch sheet. The releasing portions 46, shown in FIGS. 8 and 9, constitutes a slit in one side of the sheet 16 extending from a side 48 almost through the sheet and near to an opposite side 50, such that the cross section of the sheet is weakened along the partially slitted portion 46 so as to reduce the shear strength of the sheet and allow the sheet to tear readily from the extremity 36 of the openings 30 and to enlarge the openings into an enlarged opening to be readily removed over a partially grown plant, as illustrated in FIG. 12, and as will be more fully described in connection therewith.

It will be appreciated by those skilled in the art that the releasing portions as provided in accordance with the present invention may be in the form of slits, perforations, weakened portions, or any structure capable of being readily torn or separated from an area of the openings 30 into an enlarged opening, as will be hereinafter described.

Figure 11:
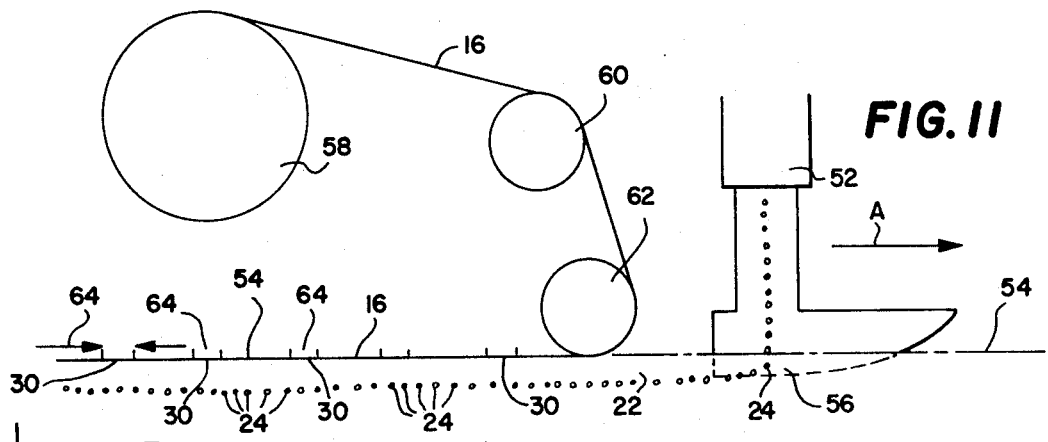
FIG. 11 is a diagrammatic view showing the planting of seeds in seed row and the placing of the mulch sheet of the invention thereover, and illustrating the spacing of holes in the sheet as they relate to the seeds planted in the soil.

In the diagrammatic view, as shown in FIG. 11, a seed planter 52 is adapted to operate slightly below the surface 54 of soil, such that the shoe 56 of the planter 52 is disposed below the surface and will deposit the seeds 24 in a seed row quite close together. As a matter of fact, much closer than the spacing of the openings 30 in the mulch sheet 16. As the planter shoe 56 advances in the direction of an arrow in FIG. 11, it is followed by a reel or roll of the plastic mulch sheet of the invention, said roll being designated 58 in FIG. 11. The mulch sheet 16 proceeding over a roller 60 substantially spaced above the ground and a second roller 62 located to operate in close tangential relationship with the surface 54 of the soil plant row.

Following the planting of seeds 24 by the planter shoe 56, the plastic mulch sheet 16 is laid over the top of the row of seeds 24, such that the openings 30 align with the row of seeds 24. The seeds in the row are spaced sufficiently close together, such that at lease one seed will align with each respective opening, 30, and the openings are spaced apart as illustrated by vertical lines 64 in FIG. 11, in order to indicate that the extent of the openings 30 is substantial with respect to the close or relatively close spacing of the seeds 24, as implanted by the planter shoe 56. Accordingly, all of the seeds 24 will not pass upwardly through the sheet, but only those aligned with the openings 30 will grow upwardly and the remaining ones will die under the black plastic sheet due to the high temperature and inability of the small plants to penetrate the sheet. Likewise, weeds and other undesirable growths may be prevented. Additionally, the black plastic will provide for the retention of moisture, it will also provide an early elevated temperature in the soil or early germination, it will maintain soil sufficiently warm to prevent frost under many conditions, and the heat during the day will completely kill many insects, including those, such as the pink follworm moth pupae. Other insects will also be killed, and in addition, the various fungus which normally thrives at temperatures between 50° and 70° degrees will be killed since early seasonal temperatures under the black plastic will exceed the survival temperature of such fungus. Accordingly, it will be appreciated that while plants are growing through the openings to a substantial size, as indicated at 68 in FIG. 12. Many parasites, pests and competing weeds will not survive. Additionally, the selective disposition of the openings alleviates the necessity for thinning of the plants in the row and insures healthy well spaced plants and optimum production without resorting to the labor of normally spacing these plants, cultivating them, and attending to very critical irrigation problems. Furthermore, early rains which normally tend to cause the soil to crust will only moisten the soil around the mulch sheet and the soil which is thus moistened, through capillary effects, will stay moist under the mulch sheet and in the areas of the openings 30 will not crust, and therefore replanting of the areas may thus be alleviated by use of the mulch sheet and method of the invention.

When the mulch sheet is applied to the soil, as shown in FIG. 11, the rollers 58, 60 and 62 are carried by the same vehicle as the planter 52, however, these elements may be carried by separate vehicles, but are moved at approximately the same rate over the respective row 22 in the direction of the arrow, as shown in FIG. 11.

After the mulch sheet of the invention has been placed, as shown in FIG. 10 and as hereinbefore described, plants are allowed to grow to the substantial size as generally shown in FIG. 12 of the drawings, at which time the frost season is usually over and most of the insects and fungus have been killed. Additionally, most of the weeds and other nondesirable plants have failed to germinate or have been killed under the high temperature condition of the black plastic sheet in areas other than openings 30.

When the plants have increased to a size, as indicated at 68 in FIG. 12 of the drawings, the mulch sheet of the invention is removed by means of a friction clutch driven reel 72 carried by a wheeled vehicle 74. The mulch sheet 16 is preferably guided over an idler roller 76 on its way to the reel 72, and as the mulch sheet 16 is pulled upwardly over the plants, as shown at 68 in FIG. 12, the various releasing releasing portions, as hereinbefore described, may be used to cause tearing or enlargement of the sheet from the openings 30 to relatively or secondary enlarged openings so that the enlarged openings may readily be moved upwardly, around and over the limbs of the plants at 68, all as shown best in FIGS. 12 and 13 of the drawings.

The plastic mulch sheet is thus removed from the agricultural area before harvest time in order that there will be no difficulty with the plastic sheet in relation to the operation of harvesting machinery, and so that there will be none of the plastic sheet remaining to impair the operation of the harvesting machinery or to be carried into the produce from the plants, and in the case of cotton harvesting, there will be no difficulty with the plastic in the gin stands or other equipment utilized to process the produce.

Figure 13:
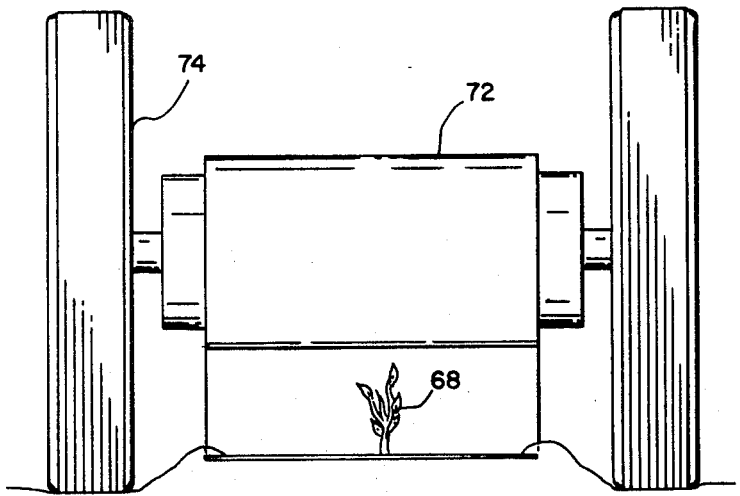
FIG. 13 is a view taken from the line 13—13 of FIG 12 showing diagrammatically the means for removing the mulch sheet of the invention from a position over partially grown plants.

It will be understood by those skilled in the art that the method of the invention, includes the closely spaced planting of the seeds 24, as well as the steps taken to produce the releasing portions in the plastic sheet or mulch sheet 16 between the openings, and the lifting of the sheet upwardly in order to cause the releasing means either to open or to tear, such as to enlarge the first openings 30 into larger openings which will readily slide upward and over the limbs of the plants, as shown at 68 in FIGS. 12 and 13.

It will also be understood by the persons skilled in the art that the various advantages hereinbefore pointed out relative to the plastic mulch sheet and method of the invention are all adapted to contribute to agronomic production.

It will be obvious to those skilled in the art that various modifications of the present invention may be resorted to in a manner limited only by a just interpretation of the following claims.

I claim:

1. A method for agronomic mulching of plant rows comprising:

planting seeds in a plant row of soil, such that the seeds are spaced close enough together to insure the growth of a plant through each of the hereinafter mentioned openings in an elongated sheet;

placing over said plant row of soil an elongated flexible sheet having opposite edges spaced apart a sufficient distance to span the soil of said plant row and having a row of first openings herein at spaced apart distances such that the spacing between said openings corresponds to the desired spacing of plants in said plant row;

said flexible sheet being placed so as to position said openings in alignment with and above said seeds in said row such that plants may grow from some of said seeds through said openings, and whereby plants will not grow from said seeds not in alignment with said openings;

said sheet having slits accompanying and communicating with a corresponding one of said first openings;

permitting said plants to grow to a size larger than the first opening through said opening;

then pulling said sheets upwardly over said plants, and said slits thereby enlarging said first openings into relatively larger second openings to remove the mulch sheet from the plant row;

concurrently rolling said sheet onto a roller, while moving said roller longitudinally along and above said row of plants.

2. A method for agronomic mulching of plant rows comprising:

planting seeds in a plant row of soil, such that the seeds are spaced close enough together to insure the growth of a plant through each of the hereinafter mentioned openings in an elongated sheet;

placing over said plant row of soil an elongated flexible sheet having opposite edges spaced apart a sufficient distance to span the soil of said plant row and having a row of first openings therein at spaced apart distances such that the spacing between said openings corresponds to the desired spacing of plants in said plant row;

said flexible sheet being placed so as to position said openings in alignment with and above said seeds in said row such that plants may grow from some of said seeds through said openings, and whereby plant will not grow from said seeds not in alignment with said openings;

said sheet having imperforate portions accompanying and communicating with a corresponding one of said first openings;

permitting said plants to grow to a size larger than the first opening through said opening;

then pulling said sheets upwardly over said plants, and said imperforate portions thereby enlarging said first openings into relatively larger second openings to remove the mulch sheet from the plant row;

concurrently rolling said sheet onto a roller, while moving said roller longitudinally along and above said row of plants.